US011627694B2

(12) United States Patent
Hiedeman

(10) Patent No.: US 11,627,694 B2
(45) Date of Patent: Apr. 18, 2023

(54) AGRICULTURAL DISTRIBUTION DEVICE AND METHOD FOR FOLDING AN AGRICULTURAL DISTRIBUTION DEVICE BETWEEN A WORKING POSITION AND A TRANSPORT POSITION

(71) Applicant: HORSCH, L.L.C., Mapleton, ND (US)

(72) Inventor: Michael Hiedeman, Mapleton, ND (US)

(73) Assignee: HORSCH, L.L.C., Mapleton, ND (US)

( * ) Notice: Subject to any disclaimer, the term of this patent is extended or adjusted under 35 U.S.C. 154(b) by 729 days.

(21) Appl. No.: 16/594,000

(22) Filed: Oct. 5, 2019

(65) Prior Publication Data
US 2020/0107489 A1   Apr. 9, 2020

(30) Foreign Application Priority Data

Oct. 5, 2018 (DE) .......................... 102018124626.9

(51) Int. Cl.
*A01B 73/00* (2006.01)
*A01B 59/06* (2006.01)
(Continued)

(52) U.S. Cl.
CPC .............. *A01B 73/00* (2013.01); *A01B 59/06* (2013.01); *A01C 7/06* (2013.01); *A01C 7/08* (2013.01); *A01C 15/003* (2013.01); *A01C 15/006* (2013.01)

(58) Field of Classification Search
CPC ....... A01B 73/00; A01B 73/04; A01B 73/042; A01B 73/044; A01B 73/046;
(Continued)

(56) References Cited

U.S. PATENT DOCUMENTS 3,401,752 A * 9/1968 Nja .................... A01B 21/08
                                                    172/440
4,328,869 A * 5/1982 Perelli ................ A01B 73/044
                                                    172/619
(Continued)

FOREIGN PATENT DOCUMENTS

| CA | 1087016 | 10/1980 |
| EP | 2995185 A1 | 3/2016 |

(Continued)

*Primary Examiner* — Jamie L McGowan
(74) *Attorney, Agent, or Firm* — Avek IP, LLC; Kent R. Erickson

(57) ABSTRACT

An agricultural distribution device for spreading granular material to be distributed such as seed, fertilizer or the like is disclosed. The distribution device has a frame with at least one storage container for material to be distributed mounted thereon and a tool bar having a toolbar center section and toolbar wings pivotally mounted on opposite ends thereof and a plurality of row units mounted on the tool bar center section and each of the toolbar wings. The toolbar wings are pivotable between working and transport positions. In the working position the toolbar wings extend generally in longitudinal alignment with the center section. In the transport position the toolbar wings are pivoted about a pivoting angle of more than 90° and up to 180° with at least a portion of each toolbar wing or any row units attached thereto supported above the at least one storage container.

19 Claims, 12 Drawing Sheets

(51) Int. Cl.
*A01C 7/06* (2006.01)
*A01C 15/00* (2006.01)
*A01C 7/08* (2006.01)

(58) Field of Classification Search
CPC ......... A01B 73/048; A01B 59/06; A01C 7/06; A01C 7/08; A01C 15/003; A01C 15/006
See application file for complete search history.

(56) References Cited

U.S. PATENT DOCUMENTS

| | | | | |
|---|---|---|---|---|
| 4,619,330 | A * | 10/1986 | Machnee | A01B 73/046 172/632 |
| 4,700,784 | A * | 10/1987 | Wiebe | A01B 73/044 280/43.23 |
| 6,089,329 | A * | 7/2000 | Smith | A01B 73/046 172/452 |
| 6,382,327 | B1 * | 5/2002 | Mosdal | A01B 73/044 172/311 |
| 6,675,907 | B2 * | 1/2004 | Moser | A01B 73/044 172/463 |
| 6,684,962 | B1 * | 2/2004 | Lewallen | A01B 73/046 172/311 |
| 7,438,137 | B2 * | 10/2008 | Pederson | A01B 73/044 172/311 |
| 8,408,326 | B2 * | 4/2013 | Yuen | A01B 73/048 172/456 |
| 8,909,435 | B2 * | 12/2014 | Tuttle | A01C 7/208 701/50 |
| 10,045,474 | B2 | 8/2018 | Bachman | A01B 63/114 |
| 2002/0017389 | A1 * | 2/2002 | Moser | A01B 73/044 111/121 |
| 2007/0056755 | A1 * | 3/2007 | Pederson | A01B 73/044 172/311 |
| 2012/0247378 | A1 * | 10/2012 | Knobloch | A01C 23/023 111/120 |
| 2013/0081829 | A1 * | 4/2013 | Tuttle | A01B 63/22 172/1 |
| 2013/0213284 | A1 * | 8/2013 | Audigie | A01B 73/044 111/170 |
| 2015/0245556 | A1 * | 9/2015 | Prickel | A01C 7/208 701/50 |
| 2017/0354085 | A1 * | 12/2017 | Schlimgen | A01B 63/14 |
| 2018/0325010 | A1 * | 11/2018 | Connell | A01C 7/06 |
| 2018/0325011 | A1 * | 11/2018 | Connell | A01C 5/066 |
| 2018/0325019 | A1 * | 11/2018 | Connell | A01C 5/068 |
| 2018/0325020 | A1 * | 11/2018 | Connell | A01C 21/005 |
| 2018/0325021 | A1 * | 11/2018 | Connell | A01B 73/044 |
| 2019/0174664 | A1 * | 6/2019 | Nuhn | A01C 3/06 |
| 2019/0239414 | A1 * | 8/2019 | DeKam | A01B 63/22 |
| 2020/0107489 | A1 * | 4/2020 | Hiedeman | A01B 59/06 |
| 2020/0221638 | A1 * | 7/2020 | Engel | F16L 37/62 |

FOREIGN PATENT DOCUMENTS

| | | |
|---|---|---|
| EP | 3085218 A1 | 10/2016 |
| WO | 2015174602 A1 | 11/2015 |

* cited by examiner

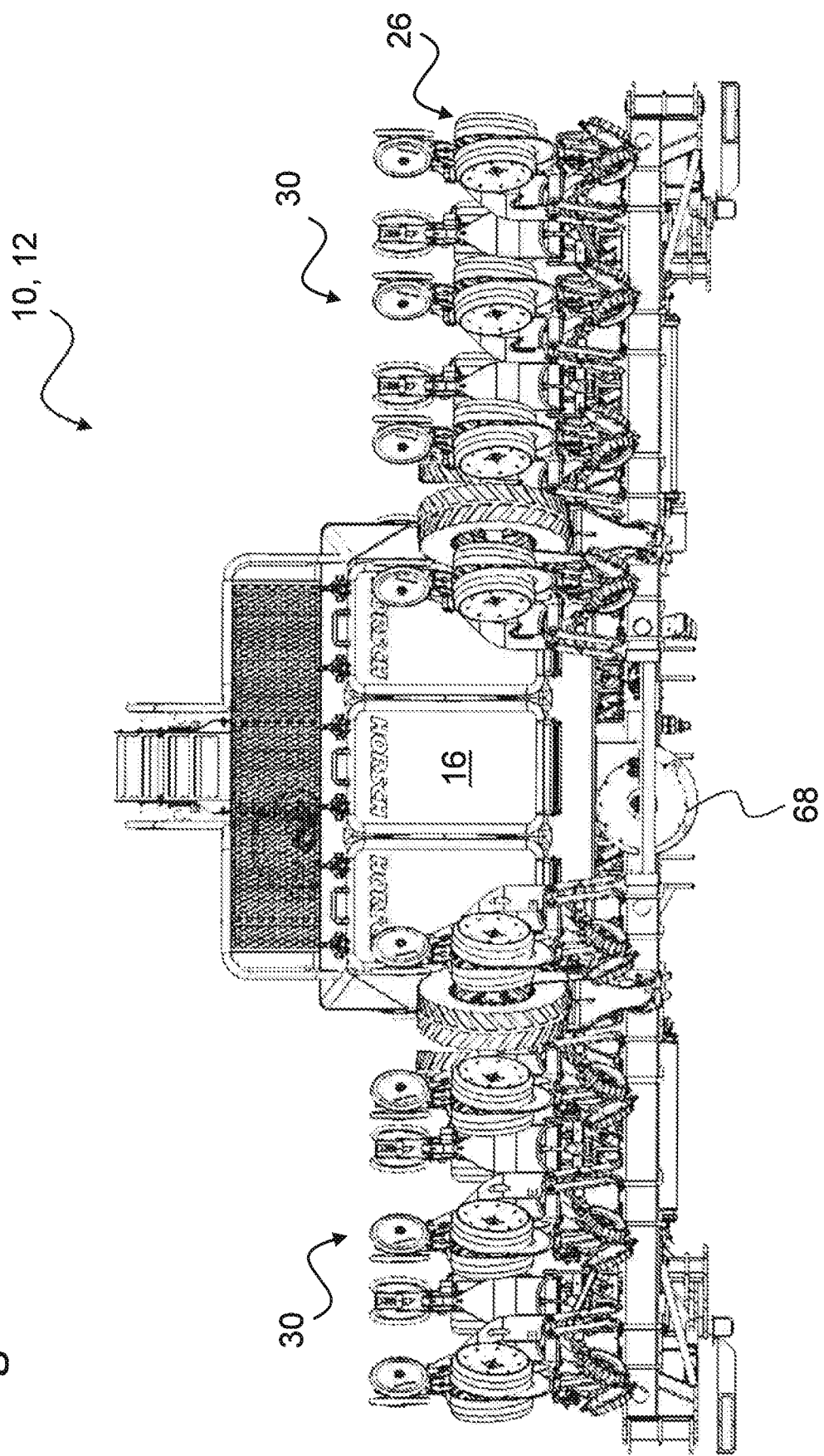

AGRICULTURAL DISTRIBUTION DEVICE AND METHOD FOR FOLDING AN AGRICULTURAL DISTRIBUTION DEVICE BETWEEN A WORKING POSITION AND A TRANSPORT POSITION

CROSS-REFERENCE TO RELATED APPLICATIONS

This application claims priority from German application No. DE 10 2018 124 626.9, filed Oct. 5, 2018, the contents of which are incorporated herein by reference.

BACKGROUND OF THE INVENTION

The present invention relates to an agricultural distribution device for distributing or spreading granular material to be distributed such as seeds, fertilizer or the like. The invention also relates to a method for folding and unfolding such an agricultural distribution device between a working position and a transport position, in which working position a plurality of row units are arranged next to each other at defined row spacings from each other for field travel, and in which transport position row units arranged on pivotable frame or toolbar wings are switched off to be inactive and are pivoted over a central toolbar section or frame center section and at least partially over a portion of at least one storage container on the center section of the frame.

In agricultural engineering, various machines are known for spreading and distributing agricultural goods to be distributed such as seeds, fertilizer or the like. In a frequently used embodiment, the granular material to be distributed is carried or provided in a storage container of an agricultural distribution machine or distribution device in order to mix the material to be distributed with an air volume flow by means of suitable dosing devices. The air volume flow is normally generated by a blower and forms a carrier medium for the material to be distributed, which material is carried along within the air volume flow. This air volume flow, which is carrying and conveying the material to be distributed, is usually conveyed to a distribution tower, which distribution tower usually has a circular or mushroom-shaped distribution head. A plurality of outlets are located at the circumference of the distribution head. Within the distribution head one central distribution air volume flow is divided into a plurality of distribution air volume flows according to the number of outlets or according to the number of seed rows or rows for material distribution that are to be supplied. Within this plurality of distribution air volume flows the material to be distributed is passed on to a large number of subordinate row units or spreading devices such as sowing coulters or the like by means of seed lines.

In practice, the number of row units arranged side by side at equal distances can vary between six and more than twenty or even more than thirty according to the selected row spacings, whereby very large machines with more than twenty or thirty rows would not be suitable for transport and/or transfer journeys without suitable folding or pivoting mechanisms. The frames or toolbars of such large machines with a plurality of row units can therefore be reduced in width by means of suitable folding mechanisms or pivoting mechanisms.

Such agricultural distribution machines or distribution devices may be equipped with further soil working elements, such as one or more rows of cultivator tines, cutting discs or other soil working tools adapted to the prevailing soil conditions. In addition, packer elements or packer rollers in the form of metal rollers, discs or in the form of tire packers may be arranged at the rear of the distribution machine or distribution device. All these additional soil working elements or tillage tools are mounted on an appropriately dimensioned frame of the distribution device and must be folded or superimposed in an appropriate manner if the width of the machine is to be reduced for road transport.

Typically, such an agricultural distribution device, which is attached to an agricultural towing vehicle, especially a tractor, on account of its overall length, is supported on a suitable running gear. In addition to tire packers located at the rear, which tire packers may function as support wheels, the running gear has further support wheels with pneumatic tires at least in the region of the storage container for the granular material to be distributed, which storage container is relatively heavy in the filled state.

For certain applications and/or purposes, however, it is advantageous to use distribution devices, such as planters, that are as compact as possible, which distribution devices do not have any other tillage tools and which also have a smaller number of e.g. only twelve or sixteen row units arranged next to each other. Depending on the frame size of such compact distribution devices, they may be suitable for conventional three-point linkage, provided that the agricultural towing vehicle or tractor used is equipped with sufficiently dimensioned lifting hydraulics. However, due to the lever ratios, it is important to limit the machine's overall length in order not to overtax the lifting hydraulics, especially when the storage container is full and correspondingly heavy. If the machine is also to have folding frame sections or folding toolbar sections that allow the machine's overall width to be reduced in the interests of road transport, a conflict of objectives arises due to the typically relatively voluminous storage container.

In view of the typically given conflict of objectives between minimizing the overall machine length and reducing the overall machine width for road transport of an agricultural distribution device prepared for coupling to a three-point linkage of a towing vehicle or tractor, the present invention is based on the task of providing a frame or toolbar construction which is as compact as possible and which can be folded for transport journeys in as little space as possible, but which frame or toolbar construction should preferably have a simple structure and which frame or toolbar construction should comprise relatively few moving parts.

SUMMARY OF THE INVENTION

To solve these problems, the invention proposes an agricultural distribution machine or distribution device such as a planter for spreading and distributing granular material such as seeds and/or fertilizer and/or the like. The agricultural distribution device or distribution machine according to the invention has a frame with at least one storage container for material to be distributed and a coupling device for coupling the distribution device to a towing vehicle or tractor, wherein this coupling device can be provided in particular for coupling to a three-point linkage of the towing vehicle or tractor. In addition, the distribution device in accordance with the invention provides that its frame has or carries the at least one storage container and a central section, to which central section, the coupling device and a plurality of row units are connected. The row units are each arranged side by side in defined or selected row spacings from one another and are designed for spreading the material to be distributed. In addition, at least two frame lateral wings or lateral wing assemblies with row units arranged thereon are provided on the distribution device, which frame lateral wings are pivotable on both sides of the central section of the frame about essentially horizontal pivot axes. These at least two frame lateral wings can each be pivoted or folded between a working position and a transport position. In the working position, the respective longitudinal extension directions of the at least two frame lateral wings are approximately aligned with a longitudinal extension direction of the central section or extend approximately parallel to the longitudinal extension direction of the central section. In the transport position the at least two frame lateral wings are pivoted by a pivoting angle of more than 90° and up to approximately 180° and are supported at least in part in an area above the at least one storage container.

In embodiments of the agricultural distribution device according to the invention, the at least two frame lateral wings can be pivoted into their transport position in particular by a pivoting angle of more than 100° and up to approximately 180°, whereby at least a section of the frame lateral wings are supported in an area above the at least one storage container. In particular, it may be provided, that the at least two frame lateral wings are pivoted into their transport position by a pivoting angle of more than 110°, in particular preferably of more than 120°, and less than 180°, and that they are thereby positioned or supported at least in part in an area above the at least one storage container. In one preferred embodiment, a toolbar wing of each of the frame lateral wings, when pivoted to and supported in the transport position, extends at an angle of approximately 160° relative to a center toolbar of the frame central section.

The folding kinematics required for this pivoting can in particular be designed to be able to pivot the frame lateral wings that are articulated to both front ends of the frame central section between a working position and a folded transport position. In one embodiment, each toolbar wing is connected, proximate an inner end, to a hinge arm and extends laterally therefrom. Each hinge arm is pivotally connected at or proximate a hinge arm pivot end to a hinge arm mount connected to the frame central section. Each hinge arm is pivotal relative to the hinge arm mount about a hinge arm axis extending approximately horizontally and transverse to and in spaced relationship above the center toolbar and proximate an end thereof, Within the working position the frame lateral wings are aligned with the central section and the working position is characterized by a pivoting angle of 0°. Although the folding kinematics would permit the frame lateral wings to be pivoted by 180° and positioned in parallel alignment on an upper side of the central toolbar section in a transport position, in practice, a pivoting angle of 180° cannot be achieved in a preferred embodiment, due to the storage container arranged within the pivoting range.

In the case of the agricultural distribution device according to the invention, a vertical plane may be provided, which vertical plane is parallel to the longitudinal extension direction of the central section of the frame or containing the central section of the frame and transverse to a horizontal longitudinal axis and/or to a direction of movement of the distribution machine, within which vertical plane the frame lateral wings are both in their working position and in their transport position. This vertical plane, which should only be regarded as a virtual plane or as an auxiliary construction for illustrating the axes of movement and planes of movement, can optionally extend through and/or intersect the at least one storage container, thereby illustrating and underlining the particularly compact design of the distribution device according to the invention. However, this vertical plane can also pass in front of or behind the storage container or storage containers, which also underlines the particularly compact design of the distribution device in accordance with the invention. The device can thus also be characterized by the fact that the frame lateral wings are within the vertical plane in each position between their respective working position and their respective transport position.

In a first embodiment of the agricultural distribution machine, each frame lateral wing can be pivoted relative to the central section of the frame via at least two pivot or swivel axes arranged parallel to one another. In the case of an alternative embodiment, however, it may also be provided that each frame lateral wing can be pivoted relative to the central section of the frame via at least two pivot or swivel axes arranged at an angle to one another, which may enable a particularly space-saving folding process, as the case may be.

The folding or pivoting of the frame lateral wings with the row units arranged thereon to the upwardly folded position can preferably take place in such a way that some of the row units or at least portions of some of the row units come to rest above the at least one storage container and do not project beyond the width of the central section of the frame. Therefore, for the transport-related folding operations no additional pivoting, rotation and/or displacement of the row units at their respective anchorages to the central section of the frame or to the frame lateral wings, as the case may be, is required.

In the case of the agricultural distribution machine in accordance with the invention, adjusting cylinders which can be acted upon with fluid pressure for the manually influenced and/or automatically controlled pivoting of the frame lateral wings can be provided between the central section of the frame and the respective frame lateral wing, i.e. hydraulically or pneumatically actuated adjusting cylinders. These adjusting cylinders can pivot the frame lateral wings between the working position and the transport position or the adjusting cylinder can pivot or swivel the frame lateral wings within the working position.

The agricultural distribution machine according to the invention can also be provided with an adjusting cylinder, which can be acted upon with fluid pressure, especially with an hydraulically or pneumatically actuated adjusting cylinder, whereby the adjusting cylinder for manually and/or automatically controlled pivoting of the frame lateral wings is located between the frame lateral wings or between parts of the frame lateral wings. This adjusting cylinder can pivot or swivel the frame lateral wings between the working position and the transport position or the adjusting cylinder can pivot or swivel the frame lateral wings within the working position.

A further embodiment of the agricultural distribution machine in accordance with the invention may have a two-part design of the storage container and/or a design of the storage container with a trough or recess for accommodating the frame lateral wings, which frame lateral wings are placed or supported in their respective transport position in an area above the storage container or storage containers.

Preferably, the agricultural distribution device according to the invention can have a central tank which constantly supplies the row units with the appropriate quantity of material to be distributed by means of a so-called SOD system (Seed-On-Demand-System) via air-supported conveying. Such a SOD system allows the use of very compactly built row units, which require no or only very small intermediate containers at the respective row units. In the transport position, the upwardly pivoted frame lateral wings with comparatively compact row units can therefore easily find space above the storage container and can be deposited above the storage container.

In a further embodiment of the invention, two or more storage containers forming the central tank can be provided, which storage containers can carry or provide two or more different materials to be distributed. The two or more different materials to be distributed can also be conveyed to the row units assisted by air pressure by means of a SOD system. It would also be conceivable to distribute two different materials, such as seeds and fertilizer, at the same time.

Optionally, the central section of the toolbar of the agricultural distribution machine may carry a total of six, eight, ten or twelve row units, while the toolbar wings may in particular each carry a number of row units equal to half the number of row units attached to the toolbar central section. Other combinations of row units are also conceivable, such as a more compact embodiment with four or six row units on the toolbar central section and two or three row units on each toolbar wing. In addition, it should be emphasized, that embodiments are also possible and make sense, in which embodiments the row units are not all arranged on the frame at the same distance from each other. This can be useful, for example, by taking into account wider lanes for later maintenance work or the like when sowing.

In addition, it may be mentioned, that the overall frame construction of the agricultural distribution device according to the invention can be kept very simple, so that it is sufficient to provide only one central frame tube for the central section of the frame which functions as the center toolbar. This central frame tube may in particular be formed by a suitably dimensioned square tube. It is also sufficient to provide appropriately dimensioned tubes for the toolbar wings, which can also be formed by appropriately dimensioned square tubes.

The frame lateral wings can easily be supplemented by track markers, which track markers are rigidly attached to the frame lateral wings or which track markers can be folded or retracted if necessary. During each passage of the distribution device or during each depositing procedure, these track markers use a disc or the like to draw a track, which track can then be recognized by the driver of the towing vehicle during the next passage over the farmland. By following this track the driver is able to exactly coordinate the subsequent passage.

The row units are designed in particular as sowing coulters and serve in particular for the individual discharge of the respective material to be distributed.

If the distribution device in accordance with the invention has previously been described, it should be expressly emphasized at this point that all aspects and design variants which have been explained in connection with the distribution device equally concern or may concern partial aspects of the following method in accordance with the invention. Therefore, if the description or the claim definitions refer to the distribution device in accordance with the invention, this equally applies to the method according to the invention. The same applies the other way around, especially all aspects explained in connection with the method according to the invention can also be partial aspects of the distribution device according to the invention.

In order to solve the above tasks, in addition to the different embodiments of an agricultural distribution machine or agricultural distribution device described above, the invention proposes a method for transferring the agricultural distribution device between a working position and a transport position, which agricultural distribution device is coupled to a towing vehicle or to a tractor by means of a coupling device. In the working position a plurality of row units is arranged next to each other for field travel with defined row spacings between each other. In the transport position the row units which are arranged externally on pivotable frame lateral wings are deactivated and lifted up. The agricultural distribution device used for this purpose, which has already been described above, has a frame with at least one storage container for material to be distributed and a coupling device for coupling to a towing vehicle or tractor, in particular for coupling to a three-point linkage of the tractor. The frame comprises or carries the at least one storage container as well as the toolbar central section having the coupling device and a plurality of row units connected thereto, which row units are arranged side by side with defined row spacings between one another for discharging the material to be distributed. The frame furthermore comprises or carries at least two frame lateral wings pivotable on both sides of the central section about essentially horizontal pivot axes with row units arranged on each toolbar wing of a respective frame lateral wing.

The method in accordance with the invention may provide in particular that the at least two frame lateral wings are pivoted into their transport position by a pivoting angle of more than 100°, in particular more than 110°, particularly preferably more than 120°, and preferably less than 180°.

The method also provides that the at least two frame lateral wings are each pivoted between a working position and a transport position. In the working position the respective longitudinal extension directions of the at least two frame lateral wings are approximately aligned with the longitudinal extension direction of the central section or are parallel to a longitudinal extension direction of the central section. And in the transport position the at least two frame lateral wings are pivoted by a pivoting angle of more than 90° and up to but preferably less than 180° and are positioned or supported so that a portion of the frame lateral wings extend in an area above the at least one storage container. Here, the at least two frame lateral wings can be pivoted, in particular they can be pivoted within a vertical plane extending parallel to the longitudinal extension direction of the central section of the frame or containing the central section of the frame and extending transversely to a horizontal longitudinal axis and/or to a direction of movement of the distribution machine. Within this vertical plane, the frame lateral wings can be both in their working position and in their transport position. The vertical plane preferably extends through and/or intersects the at least one storage container. In addition, the frame lateral wings can be in any position between their respective working position and their respective transport position within the vertical plane.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 2C shows the distribution device transferred into transport position and thus having a reduced overall width according to FIGS. 2A and 2B in a schematic plan view from above.

DETAILED DESCRIPTION

Figure 1A:
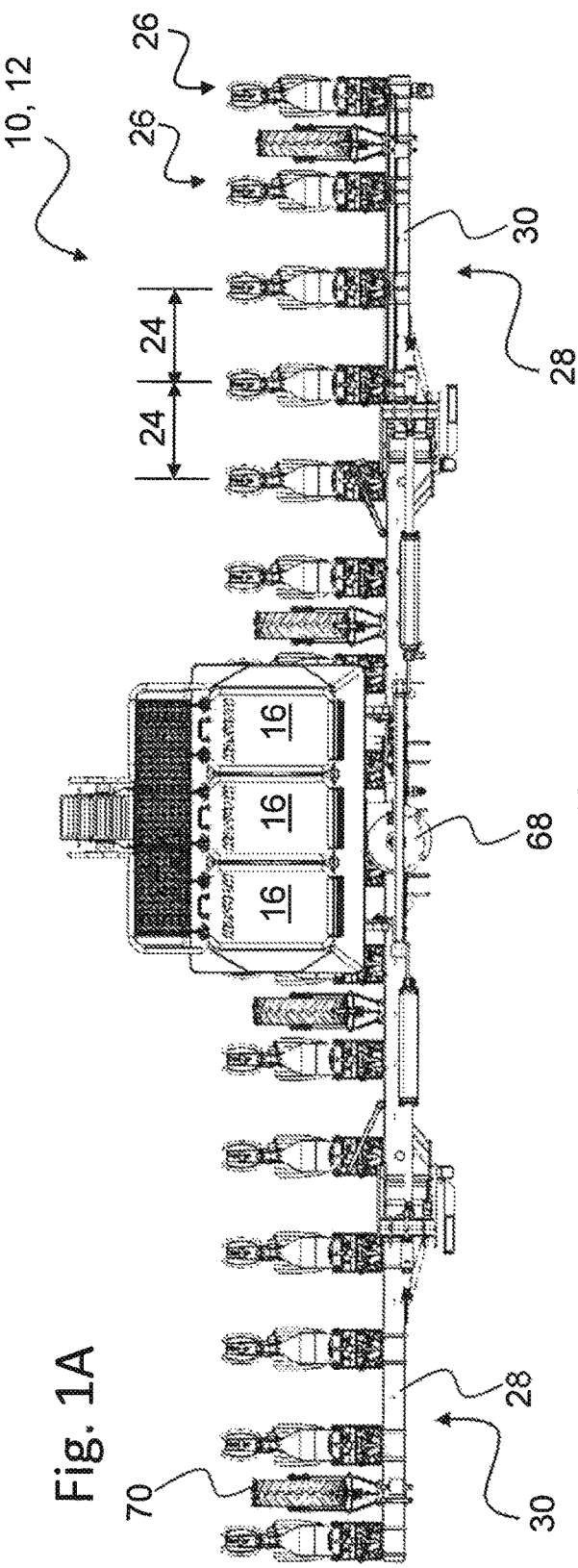
FIG. 1A shows a schematic top view of an embodiment of an agricultural distribution device according to the invention, which distribution device is in a working position intended for field travel.

For identical or equivalent elements of the invention, identical reference numbers are used in FIGS. 1A to 5. Furthermore, and for the sake of clarity, only the reference numbers relevant for describing the respective figure are shown in the individual figures. It should be understood, that the embodiments described are only examples describing an embodiment of the agricultural distribution device according to the invention. They are not intended to limit the scope of the disclosure.

On the basis of the schematic representations of FIGS. 1A to 5, an embodiment of an agricultural distribution device 10 according to the invention is explained below, whereby the agricultural distribution device 10 is shown in a working position or operating condition intended for field travel in FIGS. 1A, 1B, 1C, 1D and 1E and in a transport position or transport condition with reduced overall width intended for road travel or transport in FIGS. 2A, 2B, 2C, 2D and 2E. FIGS. 1A to 5 show an agricultural distribution device 10 or a distribution machine 10 in different views and folding states of a frame, which distribution device 10 can be used for spreading and distributing granular material such as seeds, fertilizer or the like. In the embodiment shown, the distribution machine 10 is in particular a sowing machine or planter 12, which is used for distributing granular material such as seed and/or fertilizer and/or the like. The agricultural distribution device 10 or sowing machine 12 shown has a frame 14 with a storage container 16 or with several storage containers 16 anchored to the frame 14 or supported on the frame 14, the storage container(s) containing the material to be distributed like seed, fertilizer etc. In the example shown, three storage containers of approximately the same dimensions, each storage container having a rectangular floor plan, are positioned with their respective long sides parallel beside each other, as can be seen in the two plan views of FIGS. 1A and 2C.

Figure 1B:
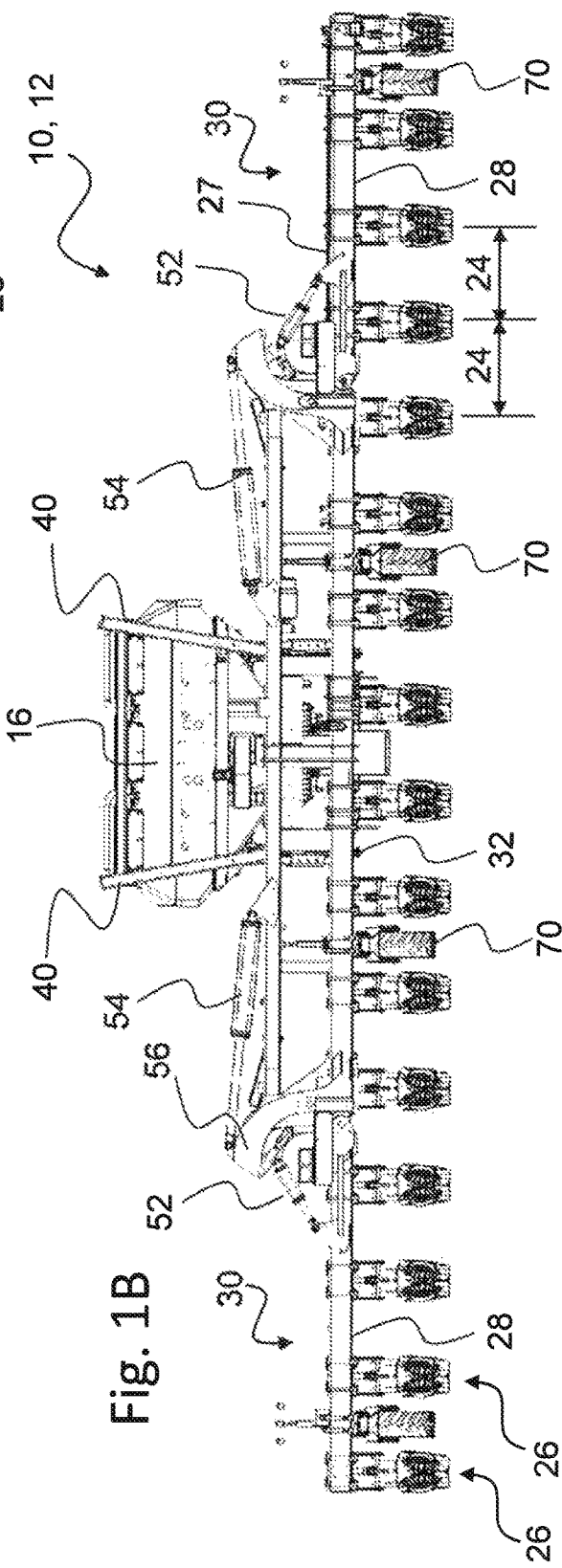
FIG. 1B shows the distribution device according to FIG. 1A in a schematic front view, where coupling devices for connection to a towing vehicle are visible.

The frame 14 is formed from a plurality of parts and essentially comprises a central section 18 with the storage containers 16 anchored thereto or supported thereon, which central section 18 also includes a coupling device or coupler 20 mounted thereon for coupling to a towing vehicle or tractor. In accordance with the embodiment shown, this coupling device 20 has a total of three coupling points 22 for coupling to a three-point linkage of a towing vehicle or tractor, which tractor is also not shown here. Several row units 26 for the spreading of the agricultural material to be distributed are arranged on a toolbar 27 forming part of the frame 14 of the distribution device 10. The toolbar 27 includes two toolbar wings 28 pivotally connected to opposite ends of a toolbar center section or center toolbar 29 which is part of the frame central section 18 The row units 26 are secured on the toolbar 27 with defined row spacings 24 between each other. As can be seen in FIGS. 1A, 1B and 1D, the distribution device 10 shown in the example comprises a total of sixteen row units 26 that are positioned next to each other on the toolbar 27, the row units 26 being spaced apart from each other in equal row spacings 24. The toolbar wings 28 in combination with the row units 26 mounted thereon may be referred to as frame lateral wings or lateral wing assemblies 30. Each lateral wing assembly 30 has a selected number of row units arranged thereon. The lateral wing assemblies 30 are pivotally mounted on both sides of the frame central section 18 to allow an operator to effectively reduce the overall width of the distribution machine 10 when required and in a simple manner, such as when traveling on roads or on narrow paths.

As FIGS. 2A to 2D illustrate, the two lateral wing assemblies 30 are arranged on both sides of the frame central section 18, wherein the lateral wing assemblies 30 are each being pivotable about essentially horizontal pivot axes. The two lateral wing assemblies 30, which are arranged and constructed symmetrically with respect to a longitudinal axis of the distribution device 10 or with respect to a vertical longitudinal plane extending through the longitudinal axis of the distribution device 10, can each be pivoted between a working position (cf. FIGS. 1A to 1D) and a transport position (cf. the FIGS. 2A to 2D). In the working position the respective longitudinal extension directions of the toolbar wings 28 are approximately aligned with a longitudinal extension direction of the toolbar center section 29 or are approximately parallel to the longitudinal extension direction of the toolbar center section 29. In the transport position, the two lateral wing assemblies 30 are pivoted through a pivoting angle of more than 90° and up to or less than 180° and are supported and/or positioned so that a portion or distal end of each of the lateral wing assemblies 30 extends in an area above the at least one storage container 16 or the plurality of storage containers 16.

Figure 2A:
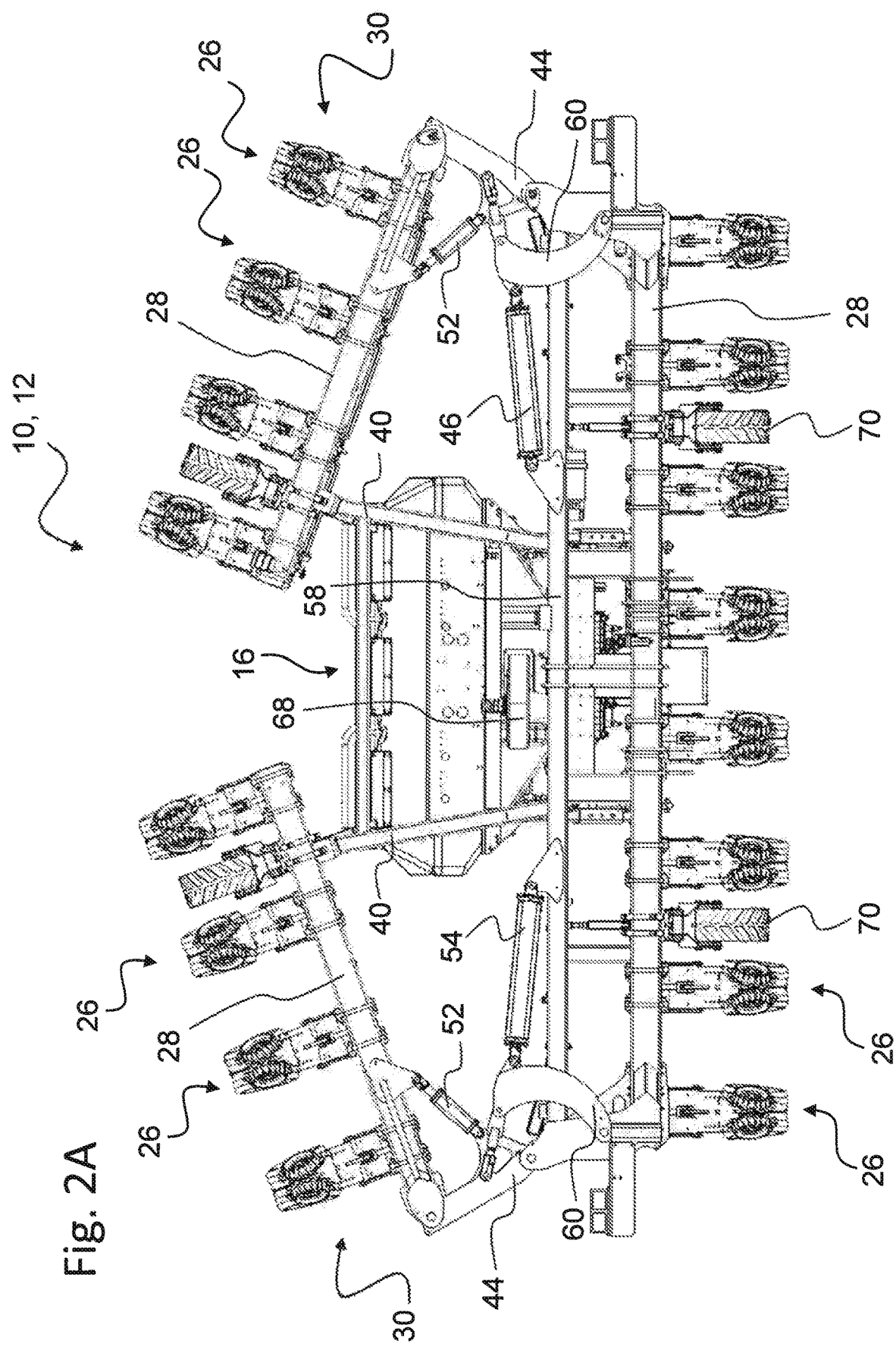
FIG. 2A shows the distribution device according to FIGS. 1A, 1B, 1C and 1D in a further schematic front view, wherein the coupling devices for connection to a towing vehicle are visible, and wherein the distribution device is in a transport position with reduced overall width that is intended for transport travel.
Figure 2B:
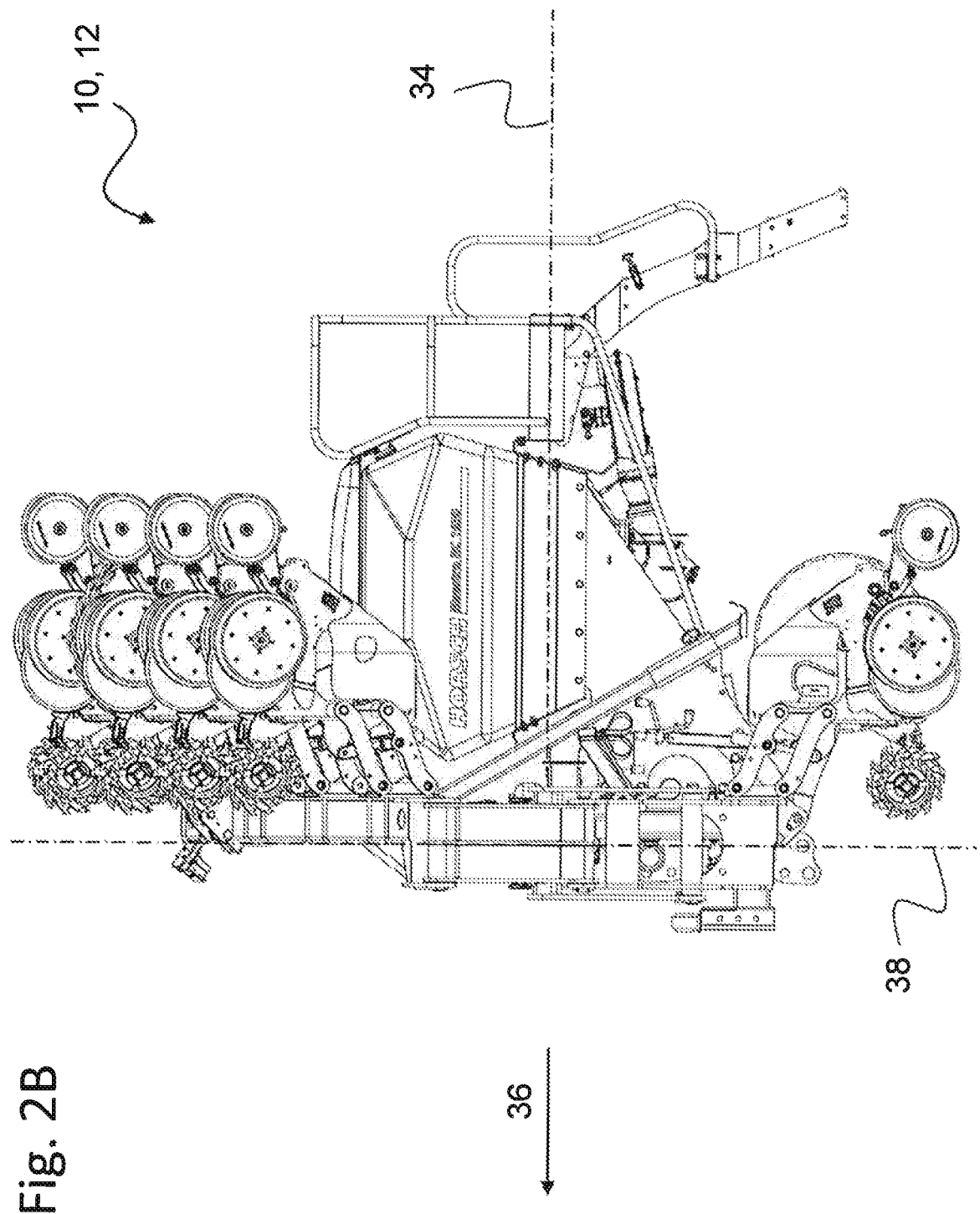
FIG. 2B shows the distribution device transferred into the transport position according to FIG. 2A in a schematic side view from the left, in which a direction of travel of a not shown towing vehicle with coupled distribution device points from the right to the left.
Figure 2D:
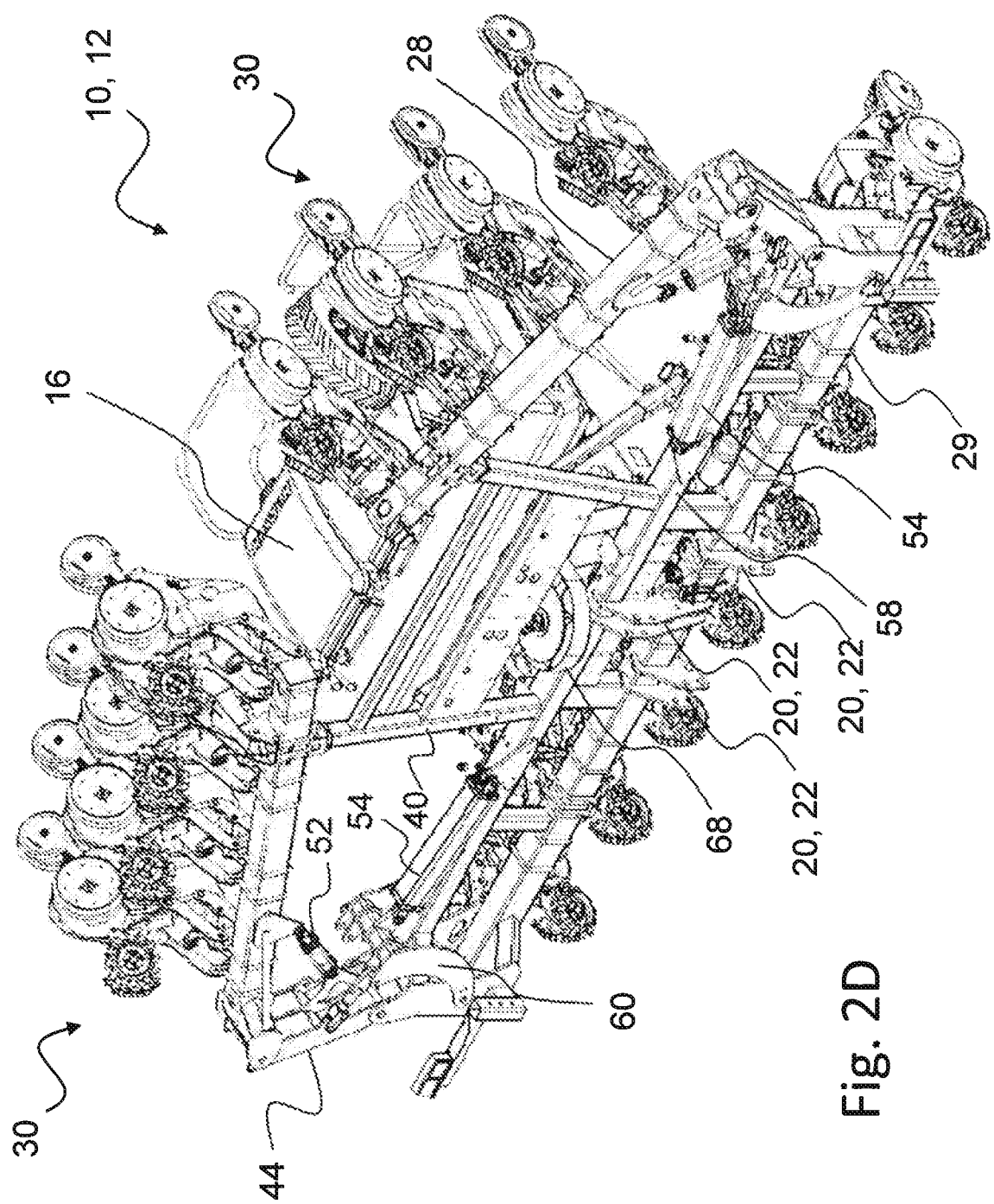
FIG. 2D shows a schematic perspective view of the agricultural distribution device already shown in FIGS. 2A, 2B and 2C, which is in a transport position with a reduced overall width intended for transport or road travel.
Figure 2E:
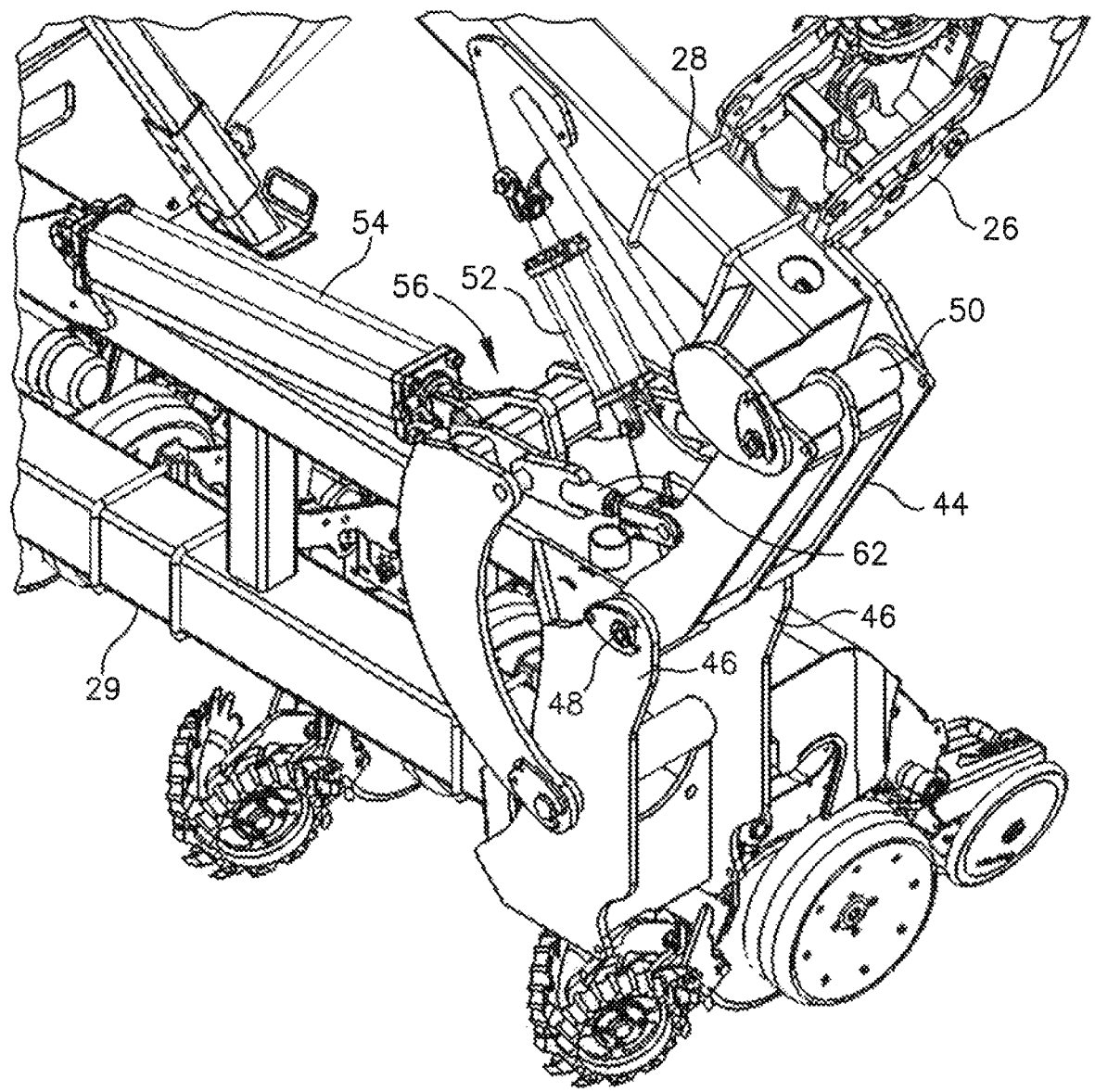
FIG. 2E shows an enlarged and fragmentary perspective view of the agricultural distribution device showing a hinge assembly connecting a frame lateral wing to a frame central section in a transport position.
Figure 3:
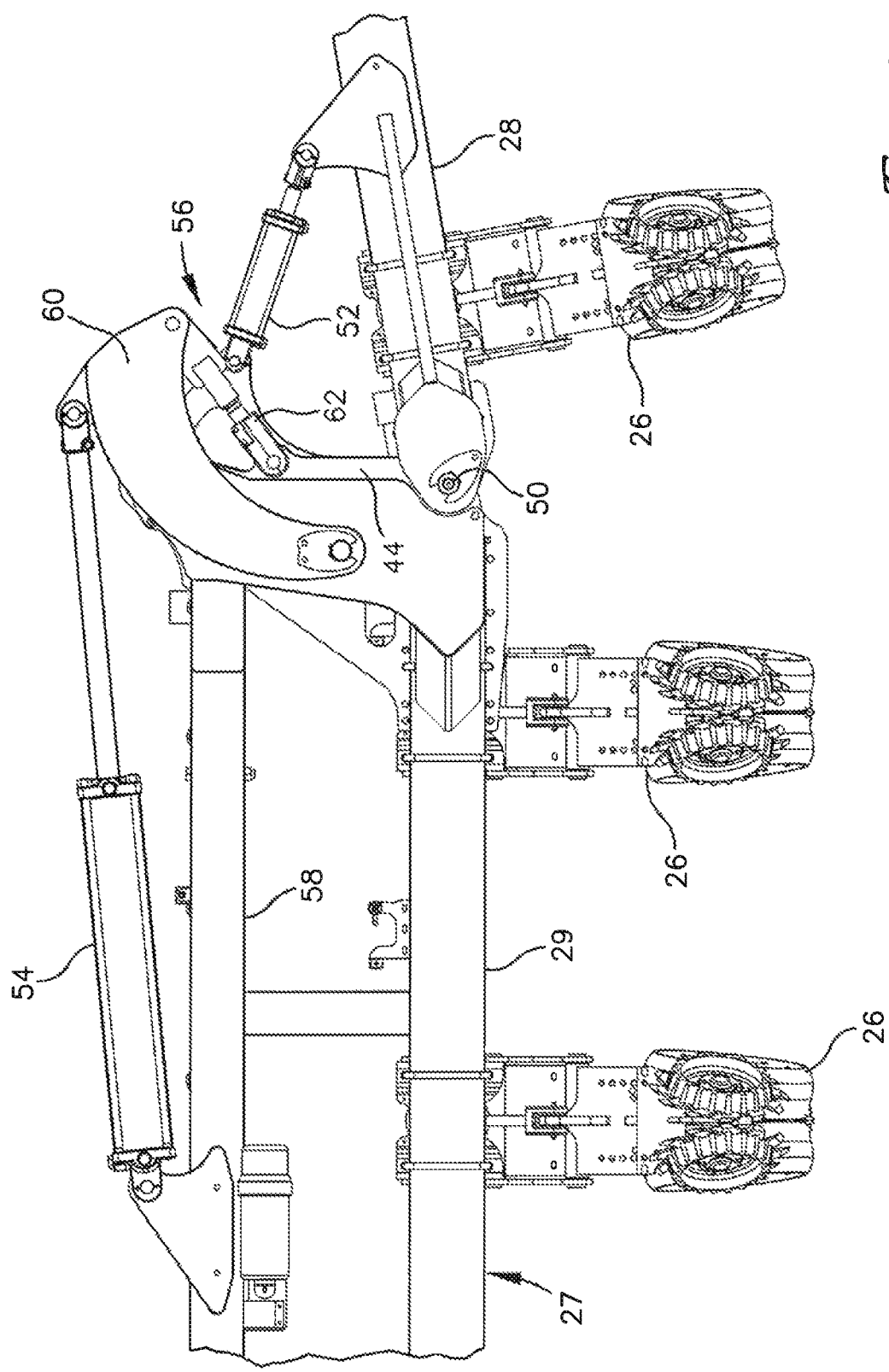
FIG. 3 is an enlarged an fragmentary, front view of the agricultural distribution machine showing the hinge assembly for connecting the frame lateral wing to the frame central section in a working position with a toolbar wing pivoted upward relative to a hinge arm to which it is connected.
Figure 4:
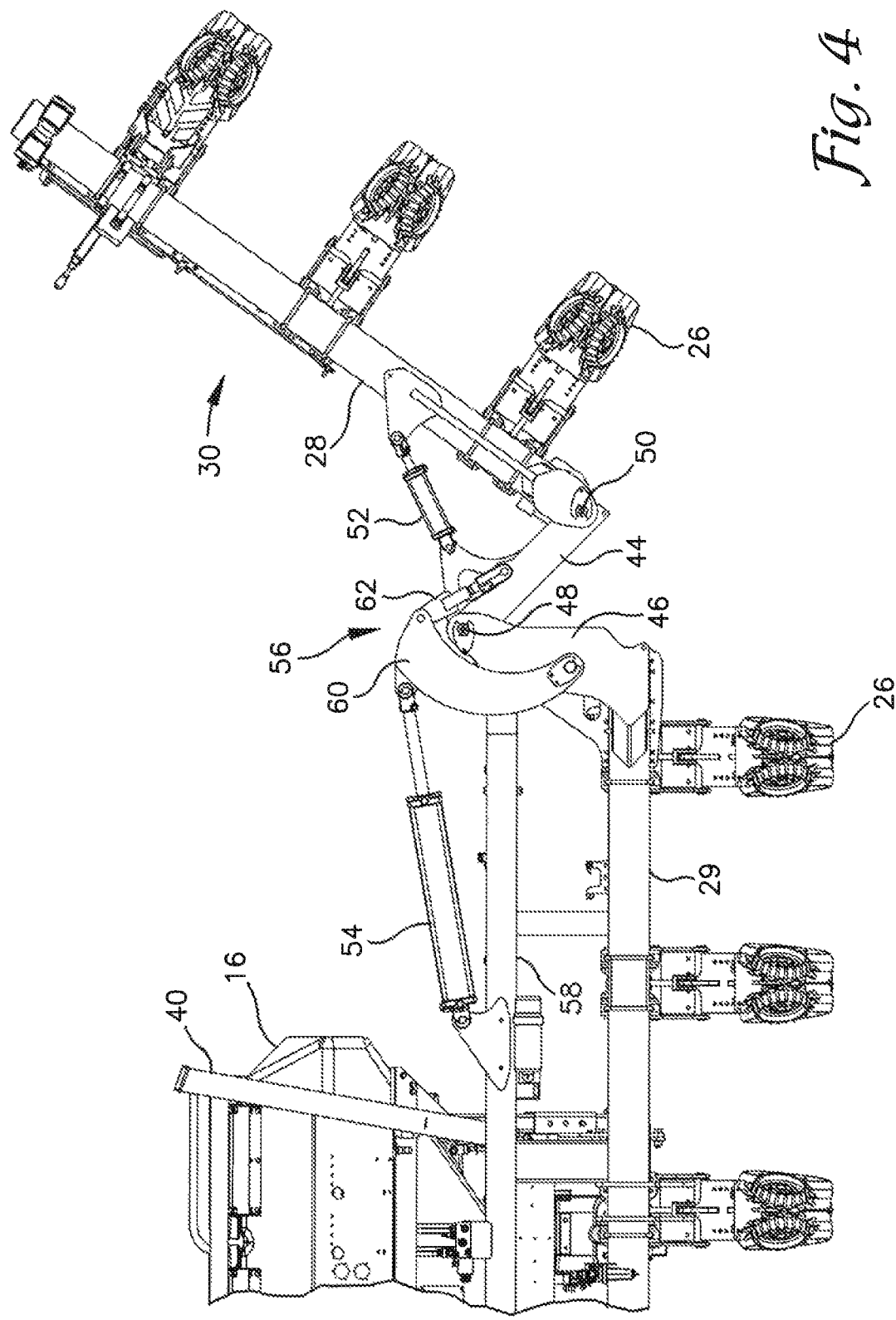
FIG. 4 is a view similar to FIG. 3 showing the frame lateral wing being pivoted at a first angle relative to the frame central section.
Figure 5:
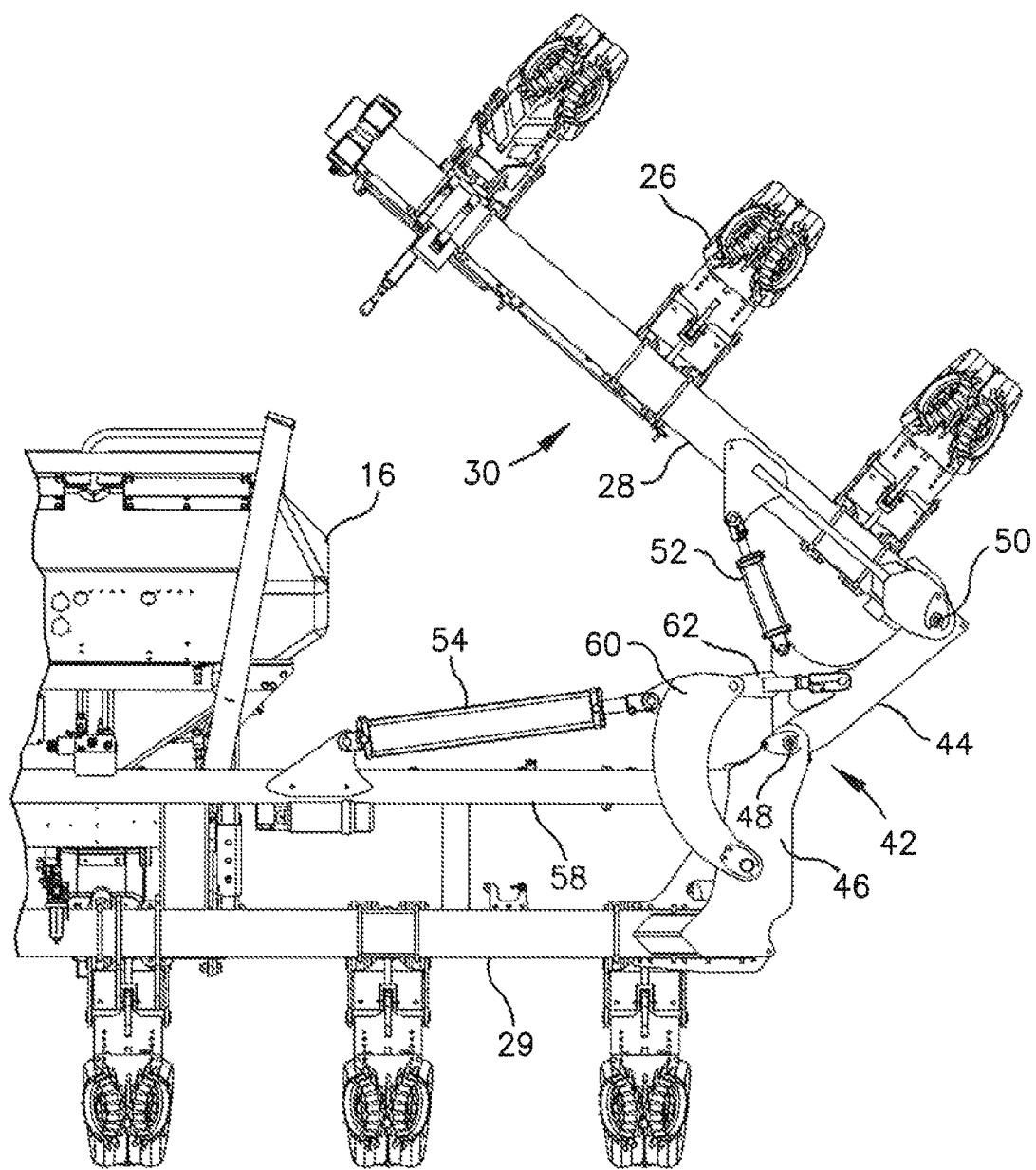
FIG. 5 is a view similar to FIG. 3 showing the frame lateral wing being pivoted at a second angle relative to the frame central section.

As best seen in FIG. 2C, in the embodiment shown, when the lateral wing assemblies 30 are folded to the transport position, only the outermost row unit 26 (and the depth control wheel 70) on each of the toolbar wings 28 extends directly over the storage container or containers 16. In addition, and as best seen in FIGS. 2A and 2B, although a distal end of each toolbar wing 28 extends higher than an upper surface of the storage container or containers 16, when pivoted to the transport position, no portion of the toolbar wing 28 extends directly over the storage container 16. It is to be understood however, that a front of the storage containers 16 could be extended further forward so that the distal ends of the toolbar wings 28 in the transport position would extend directly over a portion of the storage containers.

Figure 1C:
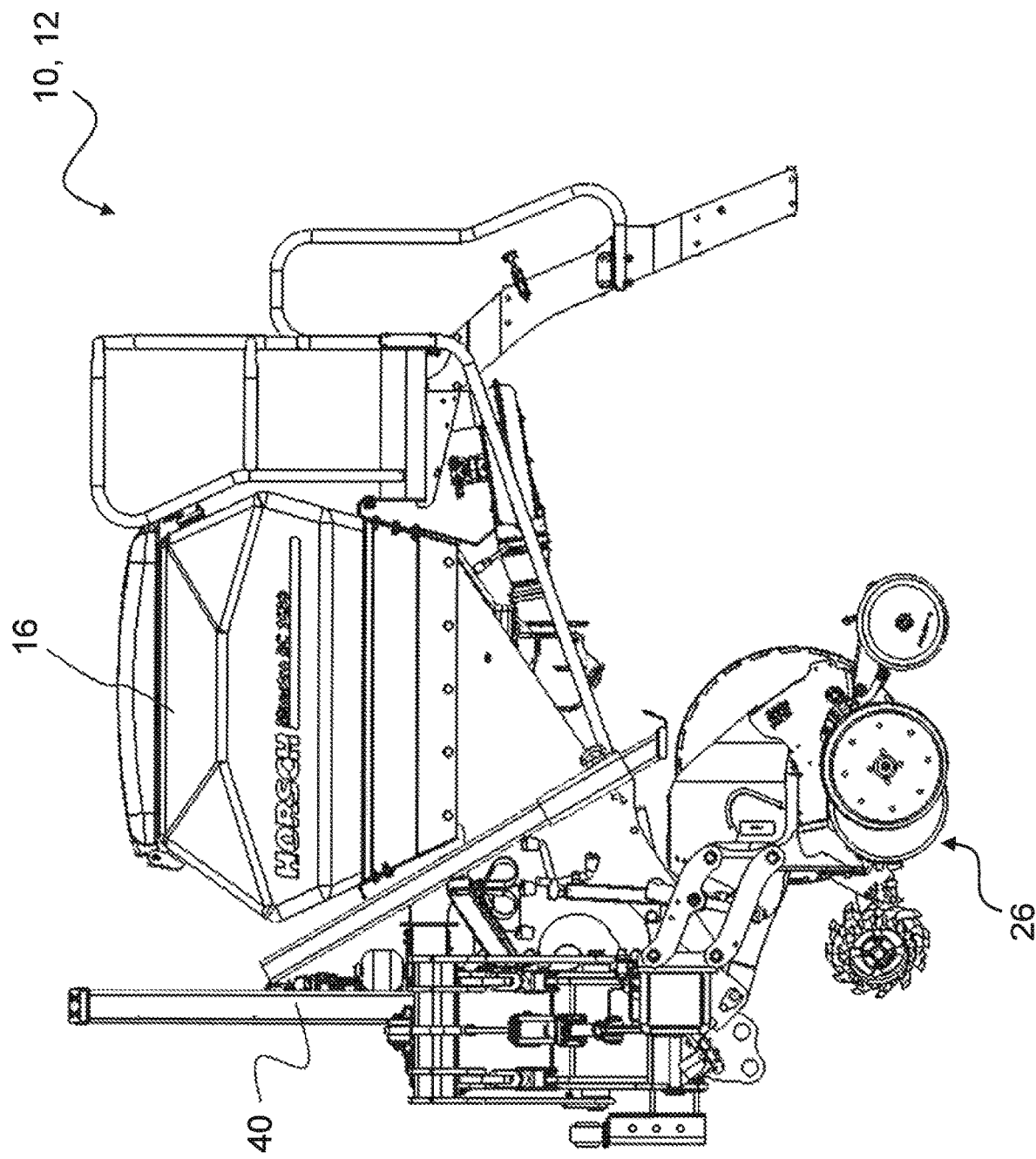
FIG. 1C shows the distribution device according to FIG. 1A and FIG. 1B in a schematic side view from the left, where a direction of travel of a not shown towing vehicle with a coupled distribution device points from right to left.
Figure 1D:
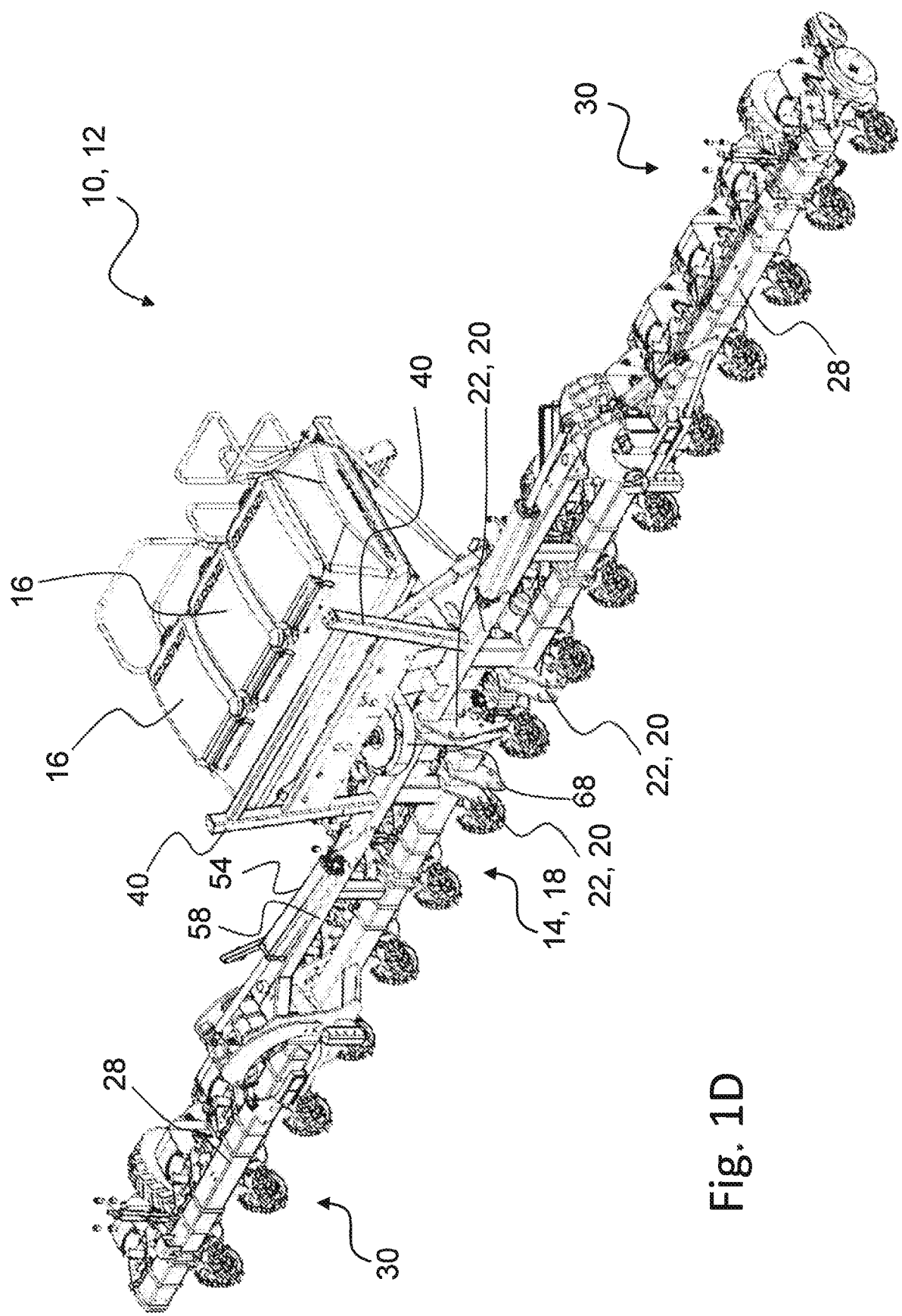
FIG. 1D shows a schematic perspective view of the agricultural distribution device already shown in FIGS. 1A, 1B and 1C, which is in a working position intended for field travel.
Figure 1E:
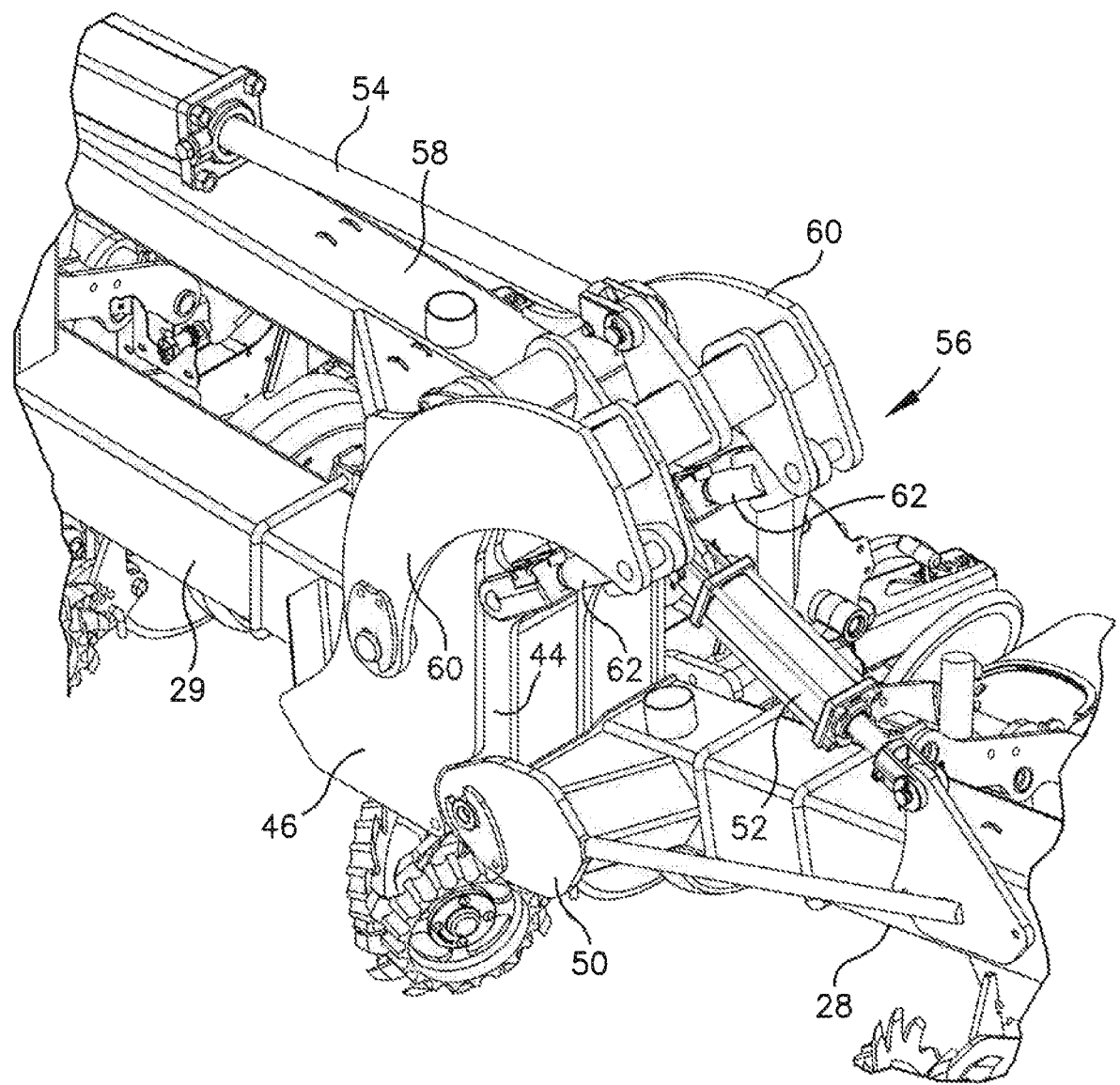
FIG. 1E shows an enlarged and fragmentary perspective view of the agricultural distribution device showing a hinge assembly connecting a frame lateral wing to a central section of the frame in a working position.

As the side views of FIG. 2B and FIG. 1C clearly show, a vertical plane 38 extending parallel to the longitudinal extension direction of the toolbar center section 29 or containing the toolbar center section 29 of the frame 14 and extending transversely to a horizontal longitudinal axis 34 and/or to a direction of movement 36 of the distribution machine 10 can be assumed or provided for in the embodiment of the agricultural distribution device 10 shown. Within this vertical plane 38, which in FIG. 2B is transverse to the drawing level and transverse to the horizontal longitudinal axis 34 of the distribution machine 10, the lateral wing assemblies 30 are located both in their working position (see FIG. 1C) and in their transport position (see FIG. 2B). This vertical plane 38, which should be regarded only as a virtual plane or as an auxiliary construction for clarifying the axes and planes of movement, may optionally extend through and/or intersect the storage container(s) 16 or, as shown in FIGS. 10 and 2B, extend with respect to the direction of movement 36 of the distribution machine 10 in front of the storage container 16 or the storage containers 16, and intersect with the frame supports of the frame central section 18 and the lateral toolbar wing assemblies 30.

Since, within the transport position, the lateral wing assemblies 30 are pivoted or swiveled upwards in such a way that the row units 26 arranged thereon are placed and/or supported in such a way that distal portions of the lateral wing assemblies come to rest in the area above the storage containers 16 without requiring any further adjustment, displacement or swiveling actions in relation to the toolbar wings 28, which toolbar wings 28 are acting as carriers for the row units 26 (cf. FIG. 2B and FIG. 2C), a particularly compact design of the distribution device 10 according to the invention can be realized. This compact design enables the attachment of the distribution device 10 to a three-point linkage of the tractor not shown here by means of the coupling device 20 comprising three coupling points 22. The very short design of the distribution device 10 with the center of gravity of the distribution device 10 close to the coupling points 22 and the thereby very short effective lever arm allows—if necessary—the complete distribution device 10 to be lifted even with full storage containers 16, for example for transport journeys.

The front view of FIG. 2A most clearly shows a possible design of the folding kinematics and the linkage of the lateral wing assemblies 30 to the central section 18 of the frame 14. Thus, the two lateral wing assemblies 30 can be swiveled or pivoted to their respective transport position by a pivoting angle of considerably more than 120°, in particular of approximately 150° or 160° or slightly more, in order to support themselves in their raised position on support struts or stanchions 40, the raised position being partly above the storage containers 16. in the embodiment shown, the support struts 40 limit the pivoting range and prevent the row units 26 anchored to the toolbar wings 28 from contacting or colliding with the storage containers 16. A support pad or stop 41 is mounted or formed on each toolbar wing 28 and positioned to abut and rest on an upper surface of a respective stanchion 40 when the toolbar wings 28 are pivoted to the transport position. In the embodiment shown, the pivoting angle must be less than 180° because engagement of the storage containers 16 by the outermost row unit 26 on each toolbar wing 28 will prevent the lateral wing assemblies 30 from pivoting the full 180°.

The folding kinematics used in the embodiment shown for the respective connection between the central section 18 of the frame 14 and the lateral wing assemblies 30 and their mode of operation becomes clear in an overview of FIGS. 1B, 1D, 1E, 2A, 2D, 2E and 3-5. In principle, the folding kinematics on each side must be designed in such a way that the lateral wing assemblies 30 articulated to both ends of the central section 18 can be swiveled between the working position and a folded transport position. In the working position, the toolbar wings 28 are in alignment with the toolbar central section 29 and the working position is characterized by a pivoting angle of 0°. In the folded transport position, the toolbar wings 28 would be swiveled by an angle of up to 180° and deposited on an upper side of the central section 18, whereby this maximum pivoting angle or swivel angle, which is basically possible in practice due to the folding kinematics, cannot be achieved in practice, in the embodiment shown, due to the storage container 16 arranged within the pivoting range.

For the swiveling or pivoting of the lateral wing assemblies 30 hydraulically, pneumatically or electrically operated actuators can be provided between the central section 18 of the frame 14 and the respective lateral wing assemblies 28, the actuators especially being provided for manually and/or automatically controlled swiveling or pivoting of the toolbar wings 28. In the embodiment shown, an offset hinge assembly 46 is used to connect each toolbar wing 28 to the frame central section 18. Each offset hinge assembly 42 includes a hinge arm 44 and a hinge arm mount 46. The hinge arm mount 46 is formed as a clevis welded or otherwise connected to the frame central section 18. In the embodiment shown, plates forming the hinge arm mount 46 are welded or otherwise secured at a lower end to the toolbar center section 29 and proximate an upper end to an actuator support beam 58 discussed in more detail hereafter. The hinge arm 44 is pivotally connected to the hinge arm mount 46 by a pivot pin 48 or the like extending through an upper end of the hinge arm mount 46 and through a pivot end of the hinge arm 44.

The toolbar wing 28 associated with each offset hinge assembly 46 is pivotally connected to a lower end of the respective hinge arm 44 by a pivot assembly 50 and extends laterally outward from the hinge arm 44. A wing adjusting actuator 52, which may be a hydraulic actuator, is pivotally connected at opposite ends between the hinge arm 44 and the toolbar wing 28 to control pivoting of the toolbar wing 28 relative to the hinge arm 44. The pivot assembly 50 and the length and positioning of the wing adjusting actuator 52 are designed to allow pivoting of the toolbar wing 28 approximately twenty degrees and generally ten degrees above and ten degrees below a perpendicular alignment between the toolbar wing 28 and the hinge arm 44 to which it is connected. During operation of the distributing device 1, with the lateral wing assemblies 30 positioned in the working position, hydraulic fluid is supplied to extend the actuators 52 and apply downward pressure on each toolbar wing 28 so that the row units 26 on each toolbar wing 28 maintain contact with the ground over which they move. A pressure relief valve incorporated into the hydraulic circuit allows the wing adjusting actuators or cylinders 52 to retract and the toolbar wings 28 and lateral wing assemblies 30 to rise in association with an upward slope of the ground.

The pivot pin 48 and the pivot end of the hinge arm 44 are supported in spaced relation above the toolbar central section 27 by the hinge arm mount 46 such that the hinge arm 44 normally hangs downward and the hinge arm mount 46 positions the inner end of the toolbar wing 28 generally adjacent to and in alignment with an end of the center toolbar 29. A lift cylinder 54, for pivoting the hinge arm 44 and associated toolbar wing 28 between the lowered working position and the raised transport position, is connected at a first end or base to the frame central section 18 and at a second or distal end to the hinge arm 44 by a linkage assembly 56. The lift cylinder 54, in the embodiment shown is a hydraulic actuator.

The base of the lift cylinder 54 is pivotally connected to an actuator mount 55 which is connected to an actuator support beam 58. The actuator support beam 58 is supported in parallel spaced relationship above the toolbar center section 29 and, in the embodiment shown, the support beam 58 extends horizontally just below the pivot axes of the hinge arms 44. Both of the lift cylinders 54 are supported on the actuator support beam 58 at opposite ends thereof. In the embodiment shown, a single actuator support beam 58 is shown supporting both lift cylinders 54. It is to be understood that separate support beams 58 could be used and the structure for supporting the base of the lift cylinders 54 above the toolbar center section 29 could take other forms including for example posts or blocks.

The linkage assembly 56 connected between the distal end of each lift cylinder 54 and hinge arm 44 includes a linkage lever arm 60 and a pair of secondary links 62. The linkage lever arm 60 is pivotally connected at a lower end to the hinge arm mount 46 below the pivot axis of the hinge arm 44 relative to the hinge arm mount 46. The hinge arm mount 46 may be considered part of the frame central section 18 and it is foreseen that the linkage lever arm 60 could be connected to other portions or structure on the frame 14. In the embodiment shown, the pivotal connection of the linkage lever arm 60 to the hinge arm mount 46 is in closely spaced relation above the toolbar center section 29 and below the support beam 58. The distal end of the lift cylinder 54 is pivotally connected to what may be referred to as a back side of the linkage lever arm 60 proximate an upper end thereof. Retraction of the lift cylinder 54 pivots the linkage lever arm 60 inward toward the center of the frame 14 and extension of the lift cylinder 54 pivots the linkage lever arm 60 outward away from the center of the frame 14.

The secondary links 62 are connected between the linkage lever arm 60 and the hinge arm 44. A first or inner end of each secondary link 62 is pivotally connected to an outer side of the linkage lever arm 60 proximate an upper end thereof. A second or distal end of each secondary link 62 is pivotally connected to an outer side of the hinge arm 44 between the hinge arm pivot axis relative to the hinge arm mount 46 and the pivotal connection between toolbar wing 28 and the hinge arm 44. In the embodiment shown, the linkage lever arm 60 is curved, with the upper and lower ends of the linkage lever arm 60 curving outward away from the center of the frame central section 18.

Extension of the lift cylinder 54 pivots the upper end of the linkage lever arm 60 and the hinge arm 44 connected thereto through the secondary links 62 outward and downward to pivot the hinge arm 44 and the toolbar wing 28 to the working position as shown in FIGS. 1A-1E, with the toolbar wing 28 extending laterally outward from the toolbar center section 27. When the lift cylinder 54 is fully extended, its distal end extends outward past the pivot axis of the hinge arm 44 and laterally outward form the vertically extending hinge arm 44. The pivotal connections of the inner and distal ends of the secondary links to the linkage lever arm 60 and the hinge arm 44 allow the secondary links 62 to pivot back under the linkage lever arm 60 to the connections with the hinge arm 44 when the hinge arm 44 and attached toolbar wing 28 are pivoted to the working position.

Upon retraction of the lift cylinder 54, to pivot the toolbar wing upward and back over the frame center section 18, the upper end of the linkage lever arm 60 initially pivots upward and inward which draws the first or inner ends of the secondary links 62 upward and inward while pivoting the second or distal ends of the secondary links outward and upward to draw or pivot the hinge arm 44 outward and upward. Further retraction of the lift cylinder 54 continues to pivot the hinge arm 44 and attached toolbar wing 28 upward and then back inward relative to the hinge arm pivot axis. Prior to or simultaneously with retraction of the lift cylinder 54, the wing adjusting cylinder 52 is preferably retracted to minimize the angle between the toolbar wing 28 and the hinge arm 44 which in an exemplary embodiment results in an angle of approximately eighty degrees. In this embodiment, once the hinge arm 44 pivots upward past eighty degrees, the toolbar wing 28 starts pivoting back over the frame center section 18. The offset hinge assemblies 42 and the lift cylinders 54 are sized and positioned to pivot the toolbar wings 28 back over the frame center section 18 into the transport position wherein the toolbar wings 28 extend at an acute angle relative to the center toolbar 29 with a distal portion of each toolbar wing 28 extending higher than an upper surface of the storage container 16 so that preferably no portion of the toolbar wing 28 or any of the row units 26 attached thereto engage or abut against the storage container 16.

In the embodiment shown, the stanchions or support struts 40 for supporting the toolbar wings 28 in the transport position extend upward from the actuator support beam 58 but could be connected to other portions of the frame 18. It is also foreseen that alternative structure for supporting the toolbar wings 28 in the transport position could be connected to or mounted on the storage container 16.

By decreasing the angle between the center toolbar 29 and toolbar wings 28 in the transport position, the overall width and height of the distribution device 10 in the transport position are reduced which is important for providing clearance while traveling on roads or when storing the distribution device 10 in a building. Mounting the toolbar wings 28 on the hinge arms 44 results in an upward displacement of the inner end of each toolbar wing 28 upon upward and inward folding of the toolbar wings 2 which then reduces the angle at which the toolbar wing 28 has to extend relative to the center toolbar 29 thereby reducing the overall width and height of the distribution device 10 in the transport position.

In the embodiment shown, the length of each hinge arm 44 from its pivot axis through the hinge arm mount 46 to its pivotal connection with the associated toolbar wing 28, is approximately forty percent of the height of the storage container 16 above the center toolbar 29. When the hinge arm 44 is pivoted upward at an angle of approximately one hundred and forty degrees, the inner end of the toolbar wing 28 is lifted a height approximately seventy percent of the height of the storage container 16 above the center toolbar 29, which significantly reduces the angle at which the toolbar wing 28 has to extend relative to the center toolbar 29 so that the distal section of the toolbar wing 28 and the row units 26 attached thereto extend higher than and above the storage container 16. As the angle the hinge arm 44 is pivoted upward approaches one hundred and eighty degrees, the distance the inner end of the toolbar wing 28 is lifted above the storage container 16 approaches eighty percent of the height of the storage container above the center toolbar 29. Preferred ratios of the length of the hinge arm 44 and the spacing of the hinge arm pivot axis above the center toolbar 29 relative to the height of the storage container 16 may range between 25% to 50% with a range of between 35% to 45% being more optimal. It is foreseen that ratios of the hinge arm length to storage container height outside these ranges may still provide for an acceptable width and height of the distributing device 10 in a transport position depending on the dimensions or configuration of other components of the distribution device 10.

It is also foreseen that the hinge arms 44 could be sized slightly longer than half the distance between the center of the center toolbar 29 and the top of the storage container 16 with the pivot axis of the hinge arms 44 positioned slightly above a point halfway between the center of the center toolbar 29 and the top of the storage container 16 so that the distal end of each hinge arm 44 could be pivoted higher than the top of the storage container 16. With the distal end of each hinge arm 44 extending higher than the storage container 16, the toolbar wings 28 connected to the hinge arms 44 could then extend parallel to the center toolbar 29. If the toolbar wings 28 are held at an angle of eighty degrees relative to the hinge arms 44, pivoting the hinge arms 44 one hundred and seventy degrees from the vertical working position would result in the toolbar wings 28 extending parallel to the center toolbar 29 in such an embodiment.

As already mentioned above, the agricultural distribution device 10 can, for example, be a so-called SOD system (Seed-On-Demand-System) in which a central storage container 16 or several central storage containers 16 supply the row units 26 continuously with the appropriate quantity of material to be distributed by means of air-assisted conveying via at least one blower 68. Such a SOD system allows the use of very compactly built row units 26, as in the embodiment shown, so that no or only very small intermediate containers are required on the respective row units 26. With the lateral wing assemblies 30 pivoted upwards, the comparatively compact row units 26 in the transport position can therefore easily find room above the storage container 16 or above the two or three storage containers 16, as shown in FIGS. 2A to 2D. Sensibly the storage containers 16 are designed in a funnel shape, whereby a dosing device can be arranged at the lowest position of each storage container 16. By means of this dosing device, which is not shown here, the respective material to be distributed is dosed in a desired quantity into a pipeline system, which pipeline system is supplied with an air volume flow. The air volume flow is generated by the blower (e.g. in the form of a radial blower or a centrifugal blower or the like). The addition of the material to be distributed to the air volume flow results within the pipeline system in an air volume flow containing material to be distributed. This air volume flow containing material to be distributed is used to transport the material with a flow velocity in the direction of a central distributor, from which central distributor the material to be distributed is forwarded to the row units 26.

In the embodiment shown, the center toolbar 29 of the agricultural distributor 10 can carry a total of eight row units 26 in the manner shown, while the toolbar wings 28 can each carry four row units 26. The center toolbar 29 of frame 14 can be formed, for example, by a suitably dimensioned square tube. Correspondingly dimensioned tube sections can also be provided as toolbar wings 28, which can also be formed by suitably dimensioned square tubes.

The lateral wing assemblies 30 can easily be supplemented with track markers which are not shown here and which may be rigidly attached to the toolbar wings 28 or which can be attached to the toolbar wings 28 in such a way that they can be folded or retracted, if necessary. During each crossing of the distribution device 10 or during each spreading operation, the track markers mark a recognizable track by means of a disc or the like, which track marking the ground is seen by the driver of the towing vehicle during the next crossing, so that the driver can follow this track for an exact connecting run.

The figures also show two depth control wheels 70 mounted to the center toolbar 29 on opposite sides of the storage container 16 and between two adjacent row units 26. In addition, the lateral wing assemblies 30 are each shown equipped with such depth control wheels 70, which are mounted on the toolbar wings 28 and sensibly located relatively far outside, especially between the outer row units 26 located at the outer edges and the row units 26 adjacent to these outer row units 26. The depth control wheels 70 can optionally be adjusted in height either manually or in a motorized and controlled manner.

The invention has been described with reference to preferred embodiments. To the expert it is also conceivable, however, to make changes and modifications without leaving the scope of protection of the appended claims. In addition, it should be noted that the reference numbers found in the above figure description in principle always refer to all FIG. 1A to 5. Thus also reference numbers, which are drawn in a figure but which are not separately mentioned or highlighted in the description passage referring to this figure are nevertheless regarded to have been disclosed, both in connection with this individual figure and in connection with the entire figure description, which refers to a preferred embodiment, but which in turn must not be regarded as restrictive with regard to the scope of protection of the claims as well as the other disclosure of the invention.

What is claimed is:

1. Agricultural distribution device comprising a frame with at least one storage container for material to be distributed and a coupling device for coupling the agricultural distribution device to a towing vehicle, which frame comprises the at least one storage container and a central section with the coupling device and a plurality of row units, which row units are arranged next to one another in defined row spacings from one another and which row units are provided for discharging the material to be distributed, and which frame comprises at least two lateral wing assemblies that can be pivoted on both sides of the central section about essentially horizontal pivot axes, with row units arranged on each frame lateral wing, characterized in that the at least two lateral wing assemblies are each pivotable relative to the central section of the frame via at least two pivot axes arranged parallel to one another and between a working position and a transport position, in which working position their respective longitudinal extension directions are approximately aligned with a longitudinal extension direction of the central section or extend approximately parallel to the longitudinal extension direction of the central section, and in which transport position the at least two lateral wing assemblies are pivoted about a pivoting angle of more than 90° and less than 180° and are deposited at least in part in an area above the at least one storage container.

2. The agricultural distribution device according to claim 1, characterized in that the at least two lateral wing assemblies are pivoted in their transport position about a pivoting angle of more than 100°, in particular of more than 110°, particularly preferably about a pivoting angle of more than 120°, and less than 180°, and are thereby deposited at least in part in an area above the at least one storage container.

3. The agricultural distribution device according to claim 1, characterized by a vertical plane extending parallel to the longitudinal extension direction of the central section of the frame or containing the central section of the frame and extending transversely to a horizontal longitudinal axis and/or a direction of movement of the distributing device, within which vertical plane the lateral wing assemblies are both in their working position and in their transport position.

4. The agricultural distribution device according to claim 3, characterized in that the vertical plane extends through and/or intersects with the at least one storage container.

5. The agricultural distribution device according to claim 3, characterized in that in any position between their respective working position and their respective transport position the lateral wing assemblies are within the vertical plane.

6. The agricultural distribution device according to claim 1, characterized by in each case at least one adjusting cylinder, which can be acted upon by fluid pressure, the at least one adjusting cylinder for manually influencing and/or automatically controlled pivoting of the lateral wing assemblies and being located between the central section of the frame and the respective lateral wing assembly.

7. The agricultural distribution device according to claim 1, characterized by a storage container or storage containers in a two-part design and/or provided with a trough or recess for receiving the lateral wing assemblies, which lateral wing assemblies are deposited in their respective transport position in the area above the storage container or storage containers.

8. The agricultural distribution device according to claim 1, characterized in that the central section carries a total of six, eight, ten or twelve row units, and that the lateral wing assemblies each carry a number of row units corresponding to half the number of row units arranged on the central section.

9. A method for transferring an agricultural distribution device, which is coupled to a towing vehicle by means of a coupling device, between a working position and a transport position, in which working position a plurality of row units are arranged next to one another each at defined row spacings from one another for field travel, and in which transport position the row units arranged externally on pivotable lateral wing assemblies are lifted up, wherein the agricultural distribution device comprises a frame with at least one storage container for material to be distributed and with the coupling device for coupling to a towing vehicle, which frame comprises the at least one storage container and a central section with the coupling device and a plurality of row units, which row units are arranged next to one another in defined row spacings from one another and which row units are provided for discharging the material to be distributed, and which frame comprises at least two lateral wing assemblies that can be pivoted on both sides of the central section about essentially horizontal pivot axes, with row units arranged on each lateral wing assembly, characterized in that the at least two lateral wing assemblies are each pivoted relative to the central section of the frame via at least two pivot axes arranged parallel to one another and between a working position and a transport position, in which working position their respective longitudinal extension directions are approximately aligned with a longitudinal extension direction of the central section or extend approximately parallel to the longitudinal extension direction of the central section, and in which transport position the at least two lateral wing assemblies are pivoted about a pivoting angle of more than 90° and less than 180° and are deposited at least in part in an area above the at least one storage container.

10. The method according to claim 9, characterized in that the at least two lateral wing assemblies are pivoted into their transport position by a pivoting angle of more than 100°, in particular of more than 110°, particularly preferably of more than 120°, and less than 180°.

11. The method according to claim 9, characterized in that the at least two lateral wing assemblies are pivoted within a vertical plane extending parallel to the longitudinal extension direction of the central section of the frame or containing the central section of the frame and extending transversely to a horizontal longitudinal axis and/or to a direction of movement of the distribution device.

12. The method according to claim 9, in which an agricultural distribution device according to claim 1 is transferred from a working position to a transport position or from a transport position to a working position by pivoting its lateral wing assemblies.

13. An agricultural distribution device for distributing material comprising:

a frame including a center toolbar upon which a plurality of row units for discharging the material to be distributed are mounted in spaced relation;

a storage container mounted on the frame;

a lateral wing assembly comprising a toolbar wing and a plurality of row units mounted on the toolbar wing, the toolbar wing is pivotally connected proximate an inner end to and extends from a hinge arm which is pivotally connected proximate a hinge arm pivot end to a hinge arm mount connected to the frame, the hinge arm is pivotal about a hinge arm axis extending transverse to and in spaced relationship above the center toolbar proximate a first end thereof, a tool bar wing pivot axis extending through the pivotal connection of the toolbar wing to the hinge arm extends parallel to the hinge arm axis;

a lifting actuator connected between the frame and the hinge arm for pivoting the hinge arm and the toolbar wing between a working position and a transport position, wherein in the working position, the toolbar wing is supported in spaced relationship below the hinge arm axis by the hinge arm and extends laterally outward relative to the center toolbar; and in the transport position the inner end of the toolbar wing extends in spaced relation above the hinge arm axis and a distal portion of the lateral wing assembly extends over a portion of the storage container.

14. The agricultural distribution device as in claim 13 wherein a pivot angle through which the hinge arm is pivoted by the actuator when pivoting between the working position and the transport position is between ninety and one hundred and eighty degrees.

15. The agricultural distribution device as in claim 13 wherein a pivot angle through which the hinge arm is pivoted by the actuator when pivoting the toolbar wing between the working position and the transport position is between one hundred and thirty-five and one hundred and seventy degrees.

16. The agricultural distribution device as in claim 13 wherein a toolbar wing actuator is connected between the hinge arm and the toolbar wing and operable to pivot the toolbar wing relative to the hinge arm.

17. The agricultural distribution device as in claim 13 wherein the frame includes an actuator support extending above the central toolbar and the lifting actuator comprises a linear actuator mounted at a first end to the actuator support and connected at a second end to a linkage assembly connected to the hinge arm.

18. The agricultural distribution device as in claim 17 wherein the linkage assembly comprises:

a linkage lever arm pivotally connected at a lower end to the frame below the hinge arm axis; the second end of the linear actuator pivotally connected to the linkage lever arm proximate an upper end and an inner side thereof; and a secondary link pivotally connected at a distal end to the hinge arm between the hinge arm axis and the connection between the toolbar wing and the hinge arm, the secondary link pivotally connected at an inner end to the linkage lever arm proximate an upper end and outer side thereof.

19. The agricultural distribution device as in claim 13 further comprising a coupling device connected to the central toolbar for coupling the agricultural distribution device to a towing vehicle.

* * * * *